US009754465B2

(12) United States Patent
Gordon et al.

(10) Patent No.: US 9,754,465 B2
(45) Date of Patent: Sep. 5, 2017

(54) COGNITIVE ALERTING DEVICE

(71) Applicant: INTERNATIONAL BUSINESS MACHINES CORPORATION, Armonk, NY (US)

(72) Inventors: Michael S. Gordon, Yorktown Heights, NY (US); James Robert Kozloski, New Fairfield, CT (US); Peter Kenneth Malkin, Yorktown Heights, NY (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 82 days.

(21) Appl. No.: 14/527,933

(22) Filed: Oct. 30, 2014

(65) Prior Publication Data

US 2016/0125726 A1 May 5, 2016

(51) Int. Cl.

*G09B 21/00* (2006.01)
*G08B 21/00* (2006.01)
*G08B 23/00* (2006.01)
*G08B 1/08* (2006.01)

(Continued)

(52) U.S. Cl.

CPC .................. *G08B 7/06* (2013.01); *G08B 1/08* (2013.01); *G08B 17/00* (2013.01)

(58) Field of Classification Search

CPC .... G09B 21/00; G09B 21/006; G09B 21/009; G09B 21/001; G09B 21/003; G09B 21/02; G09B 19/06; G09B 21/007; G09B 23/28; A61B 2560/0242; A61B 2503/08; A61B 2505/01; A61B 5/002; G08B 25/016; G08B 7/06; G08B 21/04; G08B 25/008; G08B 21/02; G08B 25/012; G08B 5/222; G08B 5/36; G08B 6/00; H04M 1/72588;

(Continued)

(56) References Cited

U.S. PATENT DOCUMENTS 5,093,651 A 3/1992 Thomas
5,917,420 A 6/1999 Gonzalez (Continued)

FOREIGN PATENT DOCUMENTS

CN 20080303678 U 9/2012
KR 10184719 B1 11/2011

(Continued)

OTHER PUBLICATIONS

JP Mangalindan, Nest's Newest Device? A smoke detector, Fortune, Oct. 8, 2013, retrieved from: http://fortune.com/2013/10/08/nests-newest-device-a-smoke-detector/.

(Continued)

*Primary Examiner* — Emily C Terrell
(74) *Attorney, Agent, or Firm* — Cantor Colburn LLP; Alexa Ashworth

(57) ABSTRACT

One aspect of the present invention provides an alerting device for sending an alert message. The method includes: determining at least one cognitive needs of one or more message recipients in the area; selecting an alert message that meets the needs of one or more message recipients in the area; and sending the alert message to one or more message recipients in the area.

17 Claims, 7 Drawing Sheets

100

400

| Message | Volume, Prosody, Voice, Etc. | Special Needs |
|---|---|---|
| Message 1 | Voice alert – "Fire.." | For someone who may not see the smoke |
| Message 2 | Voice Alert -"Wake up, Johnny..." | Young child sleeping |
| Message 3 | Extremely loud siren with flashing lights | For hearing impairment |

(51) Int. Cl.
*G08B 7/06* (2006.01)
*G08B 17/00* (2006.01)

(58) Field of Classification Search
CPC ........... H04M 3/42391; H04M 3/5116; H04M 11/04; H04R 2225/67; H04B 17/23
USPC .................. 340/504, 540, 539.1–539.31, 4.1
See application file for complete search history.

(56) References Cited

U.S. PATENT DOCUMENTS

| | | | | |
|---|---|---|---|---|
| 6,384,724 | B1 * | 5/2002 | Landais | G08B 6/00 340/331 |
| 7,181,407 | B1 * | 2/2007 | Kanevsky | G06Q 50/01 705/319 |
| 7,612,655 | B2 | 11/2009 | Kolz et al. | |
| 7,714,728 | B2 * | 5/2010 | Koblasz | A61B 5/1117 340/286.07 |
| 8,321,562 | B2 | 11/2012 | Kutzik et al. | |
| 2002/0063632 | A1 * | 5/2002 | Bowman | G06F 1/163 340/4.1 |
| 2003/0006898 | A1 * | 1/2003 | Herzberg | G08B 21/22 340/540 |
| 2003/0067386 | A1 * | 4/2003 | Skinner | G08B 25/006 340/540 |
| 2003/0189485 | A1 * | 10/2003 | Smith | G08B 21/0423 340/540 |
| 2004/0145467 | A1 * | 7/2004 | Roby | G08B 1/08 340/531 |
| 2006/0066448 | A1 * | 3/2006 | Berisford | G06Q 50/22 340/504 |
| 2008/0303678 | A1 | 12/2008 | McCredy | |
| 2009/0027225 | A1 | 1/2009 | Farley | |
| 2009/0029716 | A1 * | 1/2009 | Thomas | G01N 33/0075 455/456.1 |
| 2011/0095862 | A1 * | 4/2011 | Yang | G08B 13/19613 340/4.1 |
| 2011/0156898 | A1 * | 6/2011 | Taillefer | G08B 1/08 340/539.11 |
| 2011/0241877 | A1 * | 10/2011 | Wedig | G08B 7/066 340/540 |
| 2011/0317007 | A1 | 12/2011 | Kim | |
| 2012/0086573 | A1 * | 4/2012 | Bischoff | G06F 19/3418 340/573.1 |
| 2013/0304831 | A1 * | 11/2013 | Volach | H04L 67/24 709/206 |
| 2014/0287711 | A1 * | 9/2014 | Williams | H04M 1/72538 455/404.1 |

FOREIGN PATENT DOCUMENTS

| | | | |
|---|---|---|---|
| WO | WO 9001759 | A1 | 2/1990 |
| WO | WO2008055960 | A1 | 5/2008 |

OTHER PUBLICATIONS

"NIST Cloud Computing Program", NIST, Information Technology Laboratory, Date created: Nov. 15, 2010, Updated: Oct. 22, 2014, retrieved at: http://www.nist.gov/itl/cloud/.

* cited by examiner

400

| Message | Volume, Prosody, Voice, Etc. | Special Needs |
|---|---|---|
| Message 1 | Voice alert – "Fire.." | For someone who may not see the smoke |
| Message 2 | Voice Alert -"Wake up, Johnny…" | Young child sleeping |
| Message 3 | Extremely loud siren with flashing lights | For hearing impairment |

FIG. 4

COGNITIVE ALERTING DEVICE

BACKGROUND OF THE INVENTION

Field of the Invention

The present invention is related to alerting devices. More particularly, the present invention is related to sending an alert message according to a message recipient's cognitive needs.

Description of the Related Art

There are many different alerting devices to provide warning messages to individuals in different conditions. These devices include fire alarms, carbon monoxide monitors, home security devices, smoke-detector devices with integrated audio output, or any such device. Certain locations that contain such devices include a variety of individuals with different abilities to understand a warning message and react to it. For example, motels, apartment buildings, nursing homes, hospitals and etc. In certain situations not every individual can understand a standard warning message because of certain impairments, disabilities, contextual conditions and/or etc. There is a need for an alerting device that is capable of conveying appropriate warning messages according to each individual's abilities to understand and react to the warning message.

SUMMARY OF THE INVENTION

One aspect of the present invention provides an alerting device for sending an alert message. The method includes: determining at least one cognitive need of one or more message recipients in the area; selecting an alert message that meets the needs of one or more message recipients in the area; and sending the alert message to one or more message recipients in the area.

Another aspect of the present invention provides a system for executing sending an alert message. The system includes: a memory; a processor device coupled to the memory; and a control program communicatively coupled to the memory and the processor device. The control program comprising the steps of a method including: determining at least one cognitive need of one or more message recipients in an area; selecting an alert message that meets at least one cognitive need of the one or more message recipients in the area; and sending the alert message to one or more message recipients in the area.

Another aspect of the present invention provides a computer program product for sending an alert message, the computer program product comprising a computer readable storage medium having program instructions embodied therewith, wherein the computer readable storage medium is not a transitory signal per se, the program instructions executable by a computer to cause the computer to perform a method as identified above.

BRIEF DESCRIPTION OF THE DRAWINGS

FIG. 4 depicts a memory unit that includes a selection of alert messages according to a further embodiment of the present invention.

DETAILED DESCRIPTION OF THE PREFERRED EMBODIMENTS

Figure 1:
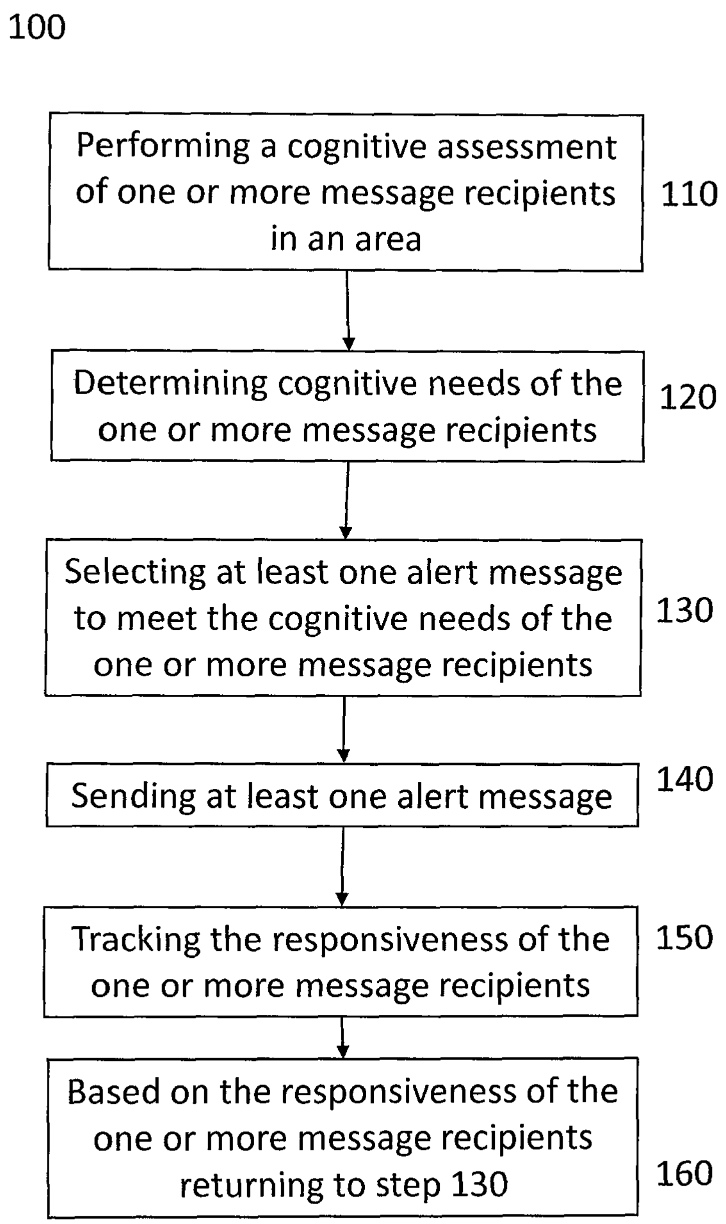
FIG. 1 depicts a method of sending an alert message from the alerting device according to an embodiment of the present invention.

The present invention can be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

FIG. 1 shows a method for sending an alert message from an alerting device according to the present invention. In a preferred embodiment of the present invention the alerting device is a hazard-alerting device. In step 110 the alerting device performs a cognitive assessment of one or more message recipients in an area. In step 120 the alerting device determines the cognitive needs of the one or more message recipients. The cognitive needs of each message recipient are determined by evaluating the cognitive assessment. In step 130, the alerting device selects at least one alert message to meet the cognitive needs of the one or more message recipients. Next, in step 140, the alerting device sends the at least one alert message. In step 150, the alerting device tracks the responsiveness of the one or more message recipients. In step 160, based on the responsiveness of the one or more message recipients the system can select another alert message.

In some embodiments of the present invention the area can be determined by a predefined or a configured radius.

The cognitive assessment includes determining cognitive profiles of one or more message recipients who are present in the area. A cognitive profile can include, but is not limited to, the message recipient's status (i.e. human or pet), age, potential distractions, physical and mental disabilities, sleeping or awake and etc. The cognitive assessment, can also include but not limited to, learning a message recipient's typical bed times, typical sleep cycles, language preferences, medications taken at bedtime, etc. The potential distractions include, but are not limited to, a person listening to music via headphones or earbuds, a person engaged in a phone conversation, a person watching tv and etc. The physical and mental disabilities can assessed by the person's speech, actions, and/also movements.

According to an embodiment of the present invention some of the information can be pre-stored in a computer file (e.g. by a user or caregiver), while other aspects of this information may be collected by performing a real-time cognitive assessment of some the message recipients' cognitive needs.

Once the cognitive profiles of each message recipient is made the system formulates the cognitive needs of the person. These cognitive needs are subject to what is necessary and useful for the message recipient to understand and react to the alerting message. For example, if a message recipient is elderly and has a hearing impairment then the alert message can be a high volume message.

According to an embodiment of the present invention, the cognitive profile can be determined using motion detectors, video analysis, sound monitors and other devices known in the relevant. Some of the information about a message recipient's cognitive needs can be pre-stored in a computer file, while other aspects of this information can be gleaned by performing a real-time assessment for some features related to cognition. For example, if a message recipient has a pre-Alzheimer's condition and is sleeping, the message may be output in a voice of someone the recipient knows, spoken more slowly and loudly, and spoken using words that the person is likely to understand. Similarly, other cognitive characteristics can be pre-stored by the individual or by family members, the staff of an assisted-care facility, and etc.

According to the present invention, some information can be determined in real-time, for example, an estimate of the message recipient's sleep state can be assessment by movement detection. The system can perform a mapping of this information to the properties of an alert message by various means, including a reading of the message file (See FIG. 4). The mapping can be performed automatically by the system and such rules can be overridden, for example, by explicit mapping instructions. Any method of mapping can be used that is known in the relevant art.

In another embodiment of the present invention, the cognitive needs of one or more message recipients can be detected by a remote device worn or proximate to the one or more message recipients. For example, a message recipient can be wearing a wristband that identifies the message recipient's condition of Alzheimers. The present invention can also utilize a personal data assistant devices (e.g. mobile smartphone) augmented to provide a vibration which can be sensed by the wearer or carrier (examples of each described in the existing art) or any other remote devices known in the relevant art.

Referring to FIG. 1, after the alerting device has determined the cognitive needs of the message recipients it will select an alert message to meet the cognitive needs of the one or more message recipients 130. According to the present invention, if there are multiple message recipients with different cognitive needs, the alerting device will select a common alerting message that will alert every message recipient. If a common alerting message cannot be selected then the alerting message can send multiple alerting messages.

In an embodiment of the present invention, the cognitive abilities and needs of a message recipient can be attested and inputted in the alerting device, so that when the presence of a message recipient is detected in the area the cognitive profile of the message recipient is determined.

In another embodiment of the present invention, the alerting device can include a brainwave tracking system and biometrics detector to estimate the cognitive state of a message recipient.

In another embodiment of the present invention the cognitive assessment is performed periodically. In other embodiments of the present invention, the cognitive assessment can occur in response to a motion or detected change of setting in the room.

In another embodiment of the present invention the alerting device can learn the cognitive profiles of different message recipients and store it in the memory for future use. For example, the system can learn a user's typical bed time from any of: motion analysis, setting of alarm clocks (and a feed from the alarm clock to the alerting system), an interface to a user's electronic calendar, a history of sleep cycles, etc. Such historical information can be used to increase the confidence that a current assessment of cognitive state is correct.

Another embodiment of the present invention the alerting device can store and evaluate historical information for a class of users and update rules associated with mapping of cognitive needs to alert messages. Such information can come from users, fire departments, psychologists, who perform studies on the message recipients temporally. The alerting device can also learn without user intervention by monitoring information regarding recipients and classes of recipients.

According to the present invention, the alert message can range from different audio sounds, visual effect and/or specific action. An example of a specific action is if a child is watching TV, the TV can shut off to obtain the child's attention. In an example in which the functioning of a remote device is affected, signals can be sent wired or wirelessly to these devices that can communicate with the alerting system using known methods in the related art using intra-device communication. In other embodiments of the present invention, the alerting device can also deliver an alert message via a wristwatch, jewelry, personal data assistant (e.g. mobile smartphone) augmented to provide a vibration which can be sensed by the wearer or carrier (examples of each described in the existing art).

According to the present invention, the sounds of the alert message can vary based on frequency, pulses, volume, melodies, rhythm patterns, speech and other methods known in the relevant art.

In an embodiment of the present invention the alerting device can send different alert messages at night when a message recipient is in bed. Accordingly, the different alert messages can be based on the message recipient's sleep state. The sleep state of the message recipient can be determined by using a remote or embedded accelerometer to detect the movement of the message recipient over the course of the night. Furthermore, the system can chart that movement to determine which phase of your sleep cycle you're in at what time of the night.

In one embodiment of the present invention, the alert message sounds can be selected via a network system. For example, if there is a dog in the area and the alert message is designed to have the pet vacate the parameters, the system can remotely send a search through the internet to locate sounds that aggravate a dog so it vacates the area.

Referring to FIG. 1, in step 150, the alerting device tracks the responsiveness of the one or more message recipients. In an embodiment of the present invention, this can be detected by the movement of the message recipients. This can be accomplished by using motion detectors, video camera analysis, sound monitors and/or other methods known in the relevant art.

According to the present invention, the responsiveness of the message recipients is dependent on the type of alerting device. For example, if it is a fire alarm, then the responsiveness will be based on whether or not the message recipients have vacated or started to vacate the premises. In another embodiment of the present invention, if the alerting device is a home security system, then the responsiveness will be based on whether or not the message recipients have woken up and called for help, or have found a hiding place.

According to the present invention, in response to the responsiveness of the message recipients the alerting device will continue to send the alert message it has previously sent. However, if there is minimal or no responsiveness from one or more of the message recipients the alert message will change and send a different alert message. According to the present invention, the alerting device can include a minimal threshold of movement to determine if the minimum responsiveness is met. For example, if the system detects that a user has responded, by motion detection, another urgent alert message may be sent. This detection can be performed by known detection methods such as using an accelerometer coupled to the bed, a pillow, a foot, etc.

In another embodiment of the present invention, a confidence level can be associate with the cognitive needs of a message recipient. The confidence level can provide the level of confidence that the alerting device has on the cognitive needs it has correlated with the message recipients. Furthermore, the confidence level can change according to the message recipient's responsiveness to the alert message. In another embodiment of the present invention, there can be a minimum confidence level that can trigger the alerting device to select a different alert message.

Figure 2:
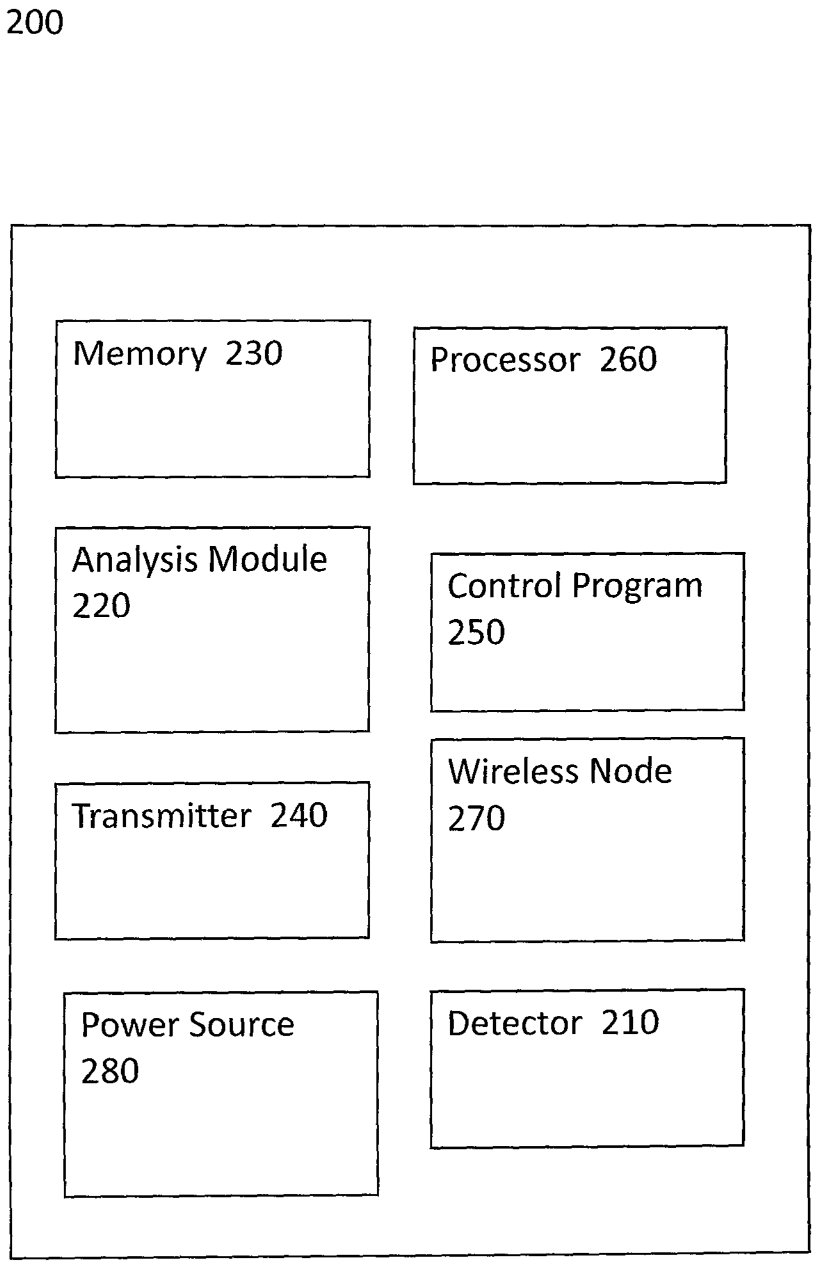
FIG. 2 depicts a hardware infrastructure of the alerting device according to a further embodiment of the present invention.

FIG. 2 depicts the major hardware components of the alerting device 200 according to an embodiment of the present invention. The detector 210 detects any condition that will cause an alert message to be sent to the surrounding area. The detector includes a sensor to detect a condition. The condition detected depends on the type of alerting device. These sensors and detectors are known in the relevant art. The programmable processor 260 executes the control program 250 to control the operations of the alerting device. The analysis module 220 performs the cognitive assessment of the message recipients in the area. The analysis module 220 can include, but is not limited to, a video camera, motion detector, sound monitor, and/or any other device that can assist in determining the cognitive profile or performing the cognitive assessment of the message recipients. The memory 230 storage includes different alert messages. The transmitter 240 sends the alert message. The transmitter can include any visual displays, lighting devices, speaker and/or any other device that can assist in sending the appropriate alert message. The alerting device also includes a wireless node 270, which can include any sort of remote connection, such as Bluetooth 3.0. The wireless node 270 allows the alerting device to be connected to other devices/network services in the area in the need of an emergency. In other embodiments of the present invention, traditional wire systems can also be used. The alerting device includes a power source 280 which can be a battery, electric feed, or any other method known in the relevant art.

According to the present invention the analysis module can obtain information regarding a person (or pet) that can be tracked by various means including sensors located in the alerting device or a remote device. Information from these sensors (e.g. audio and visual information, motion data, biometric data, etc.) can be fed to a local and/or remote storage and analyzed in an analysis module, which also can be located in the alarm device, near the alarm device, or on a remote computer. The analysis module can include typical information-processing hardware such as a CPU (central processing unit) and related storage media. Information of this kind can be transferred using traditional means of data transfer along wired and wireless digital networks.

According to the present invention, the control program 250 performs all the functions required to control the operation of the alerting device 200. In the preferred embodiment, this includes the functions of operating the different hardware components to send the appropriate alerting message to the message recipients.

In an embodiment of the present invention, a control program 250 can be represented in memory 230, and that a control program can have a more complex structure; it can include multiple modules of executable instructions, and allocate or utilize any of various data structures.

In an embodiment of the present invention, the analysis module is connected remotely to a video camera, motion detector, sound monitor and/or any other device that can assist in determining the cognitive profile of the message recipients.

In an embodiment of the present invention, the alerting device is connected to an emergency agency. If there are a number of attempts to alert one or more message recipient fails to cause a reaction from the one or more message recipients, the alerting device can alert the emergency agency using known methods in the related art. The message delivered to the emergency agency, is not limited to the emergent condition, but can provide information about the message recipient who has not yet responded to the alert message.

In one embodiment of the present invention there can be one alerting device in an area that is connected to multiple devices that are conditioned to warn individuals. For example, an alerting device can be connected to a fire alarm, a carbon monoxide detector, and a home security system. The alerting device can respond accordingly depending the condition that has been detected.

The alerting device can be any system that needs to give an alert message. This can be a warning device or even a phone. In the alerting device the alerting message should be able to trigger a reaction from the surrounding message recipients.

Figure 3:
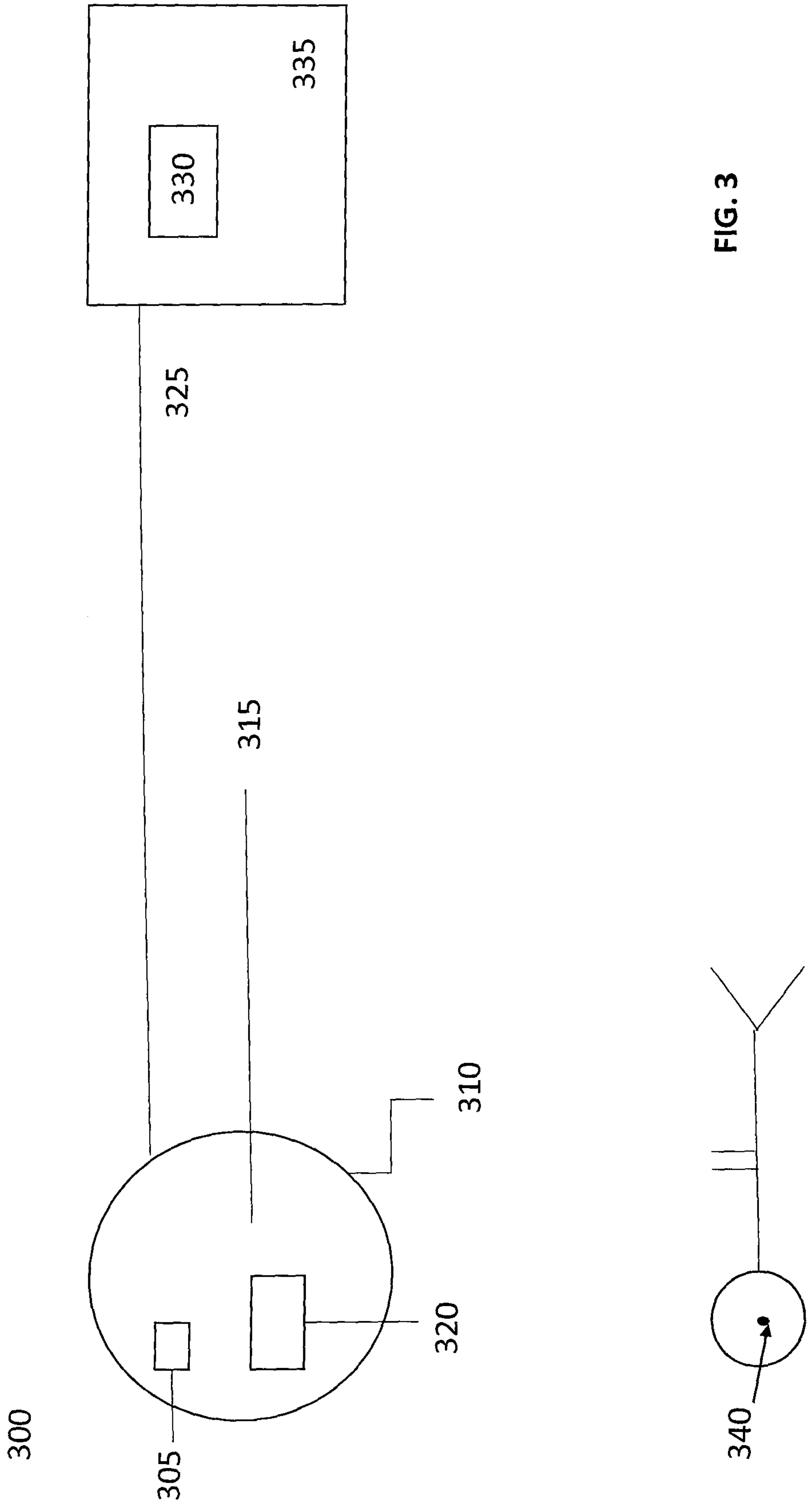
FIG. 3 depicts a cognitive smoke detector according to a further embodiment of the present invention.

FIG. 3 shows a cognitive smoke detector according to an embodiment of the present invention. Referring to FIG. 3, the alerting device is a cognitive smoke detector 310. The cognitive smoke detector 310 is connected to a power source 315 (e.g. battery and/or electrical feed). The cognitive smoke detector includes an audio output 305 to send alert messages. It also has an optional mechanism for audio information storage 320 and a network connection 325 (wired or wireless) to additional storage 330, such as remote storage on a cloud computer or a device in the home or building 335. The storage 320 and 330 can contain digital wave files of alert messages, or the storage can contain information that points to such alert messages. The local storage 320 can be quite useful in the event of a network outage. In the case of a hearing impaired message recipient, the alert message may optionally be conveyed though known means to a cochlear implant 340. In some embodiments, such as a wrist band (not shown) can be worn to aid in identification of a particular message recipient.

According to another embodiment of the present invention, the alerting device can include an alarm system for certain hearing impaired individuals having implanted hearing assistive devices contains a device for detecting an alarm condition, and a transmitter which is tuned to a resonant frequency of an implanted passive energy portion of a cochlear implant or similar device. First, both the cognitive and hearing state and ability of the message recipient is assessed or supplied to the alerting device. Upon detection of an alarm condition, the transmitter transmits an alarm signal at the resonant frequency, causing the implanted device to resonate even in the absence of the externally worn hearing assistive portion. The present invention can include a cognitive and hearing assessment module so as to adjust the alarm signal which can be: constant, pulsed, and of different frequencies and intensities. Resonance is perceived by the hearing impaired individual as a buzzing or other abnormal noise, alerting the individual to the alarm condition.

FIG. 4 shows a data file with records that contain a selection of alert messages according to an embodiment of the present invention. The alert messages are organized based on optional characteristics such as volume, prosody changes, voices, language (e.g. English vs. German) special cognitive needs, etc. For example, Message 1 may be, "Fire. Move to the nearest exit," spoken in a loud male voice. Message 2 may be, "Wake up, Johnny! This is mom. Get out of the house now." Message 3 may be extremely loud, for the hearing impaired and/or be transmitted to a cochlear implant of a user who is nearby. In one embodiment of the present invention a separate data profile can be used to specify cognitive needs, IDs of message recipients, etc.

Figure 5:
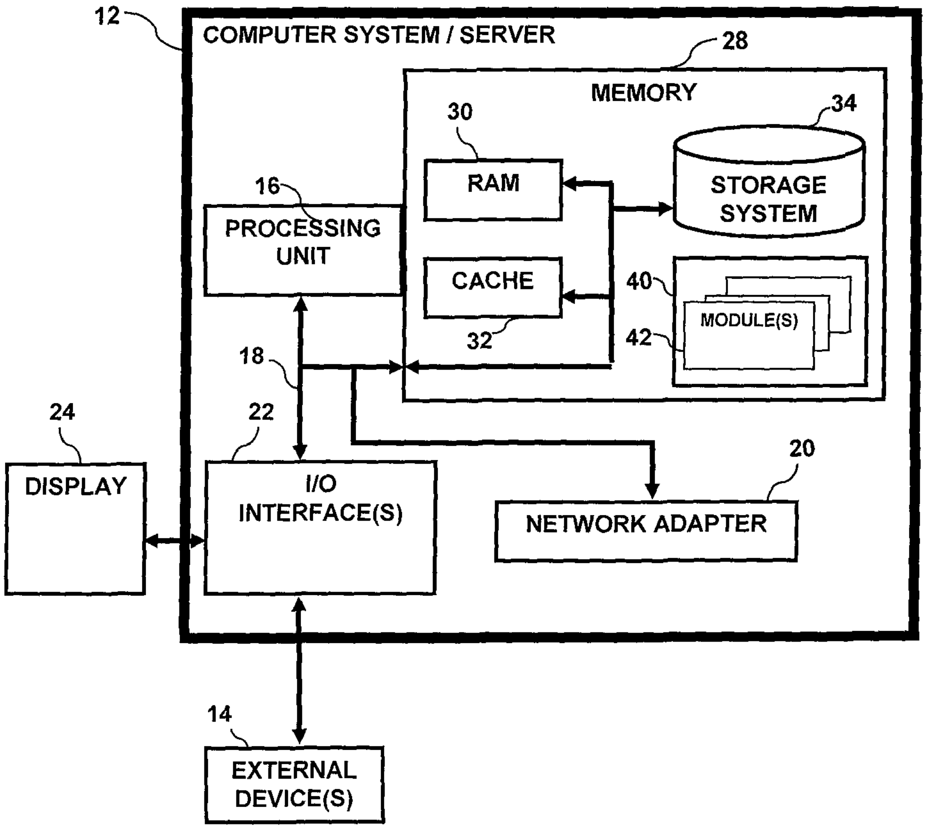
FIG. 5 depicts a computing machinery embedded in each smart device in a further embodiment of the present invention.

FIG. 5 depicts is a block diagram of an exemplary computer system/server 12 in detail, which is applicable to implement the embodiments of the present invention. Computer system/server 12 is only illustrative and is not intended to suggest any limitation as to the scope of use or functionality of embodiments of the invention described herein.

As shown in FIG. 5, computer system/server 12 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12 and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 (such as a keyboard, a pointing device, a display 24, etc.), one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to, microcode, device drivers, redundant processing units, external disk drive arrays, RAID systems, tape drives, and data archival storage systems, etc.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a cloud computing node is shown. Cloud computing node is only one example of a suitable cloud computing node and is not intended to suggest any limitation as to the scope of use or functionality of embodiments of the present invention described herein. Regardless, cloud computing node is capable of being implemented and/or performing any of the functionality set forth hereinabove.

In cloud computing node there is a computer system/server 500, which is operational with numerous other general purpose or special purpose computing system environments or configurations. Examples of well-known computing systems, environments, and/or configurations that can be suitable for use with computer system/server 700 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 500 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 500 can be practiced in distributed cloud computing environments where tasks are performed by remote processing devices that are linked through a communications network. In a distributed cloud computing environment, program modules can be located in both local and remote computer system storage media including memory storage devices.

Figure 6:
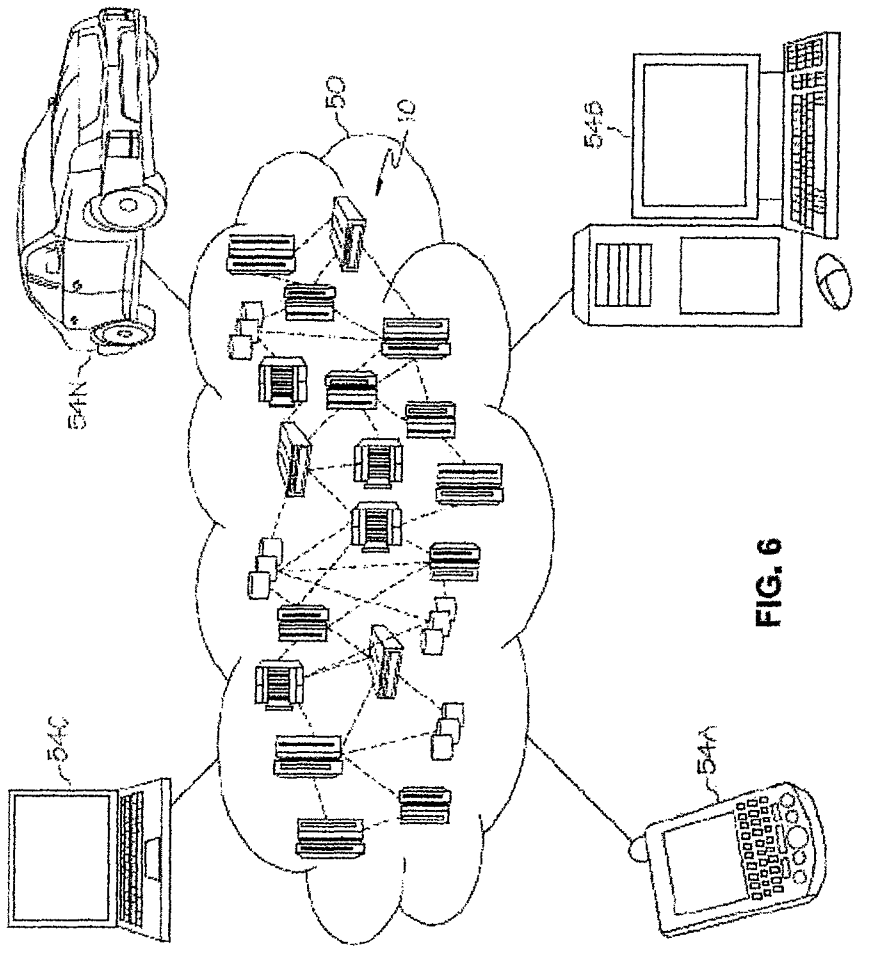
FIG. 6 depicts a cloud computing environment according to a further embodiment of the present invention.

Referring now to FIG. 6, an example illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 7:
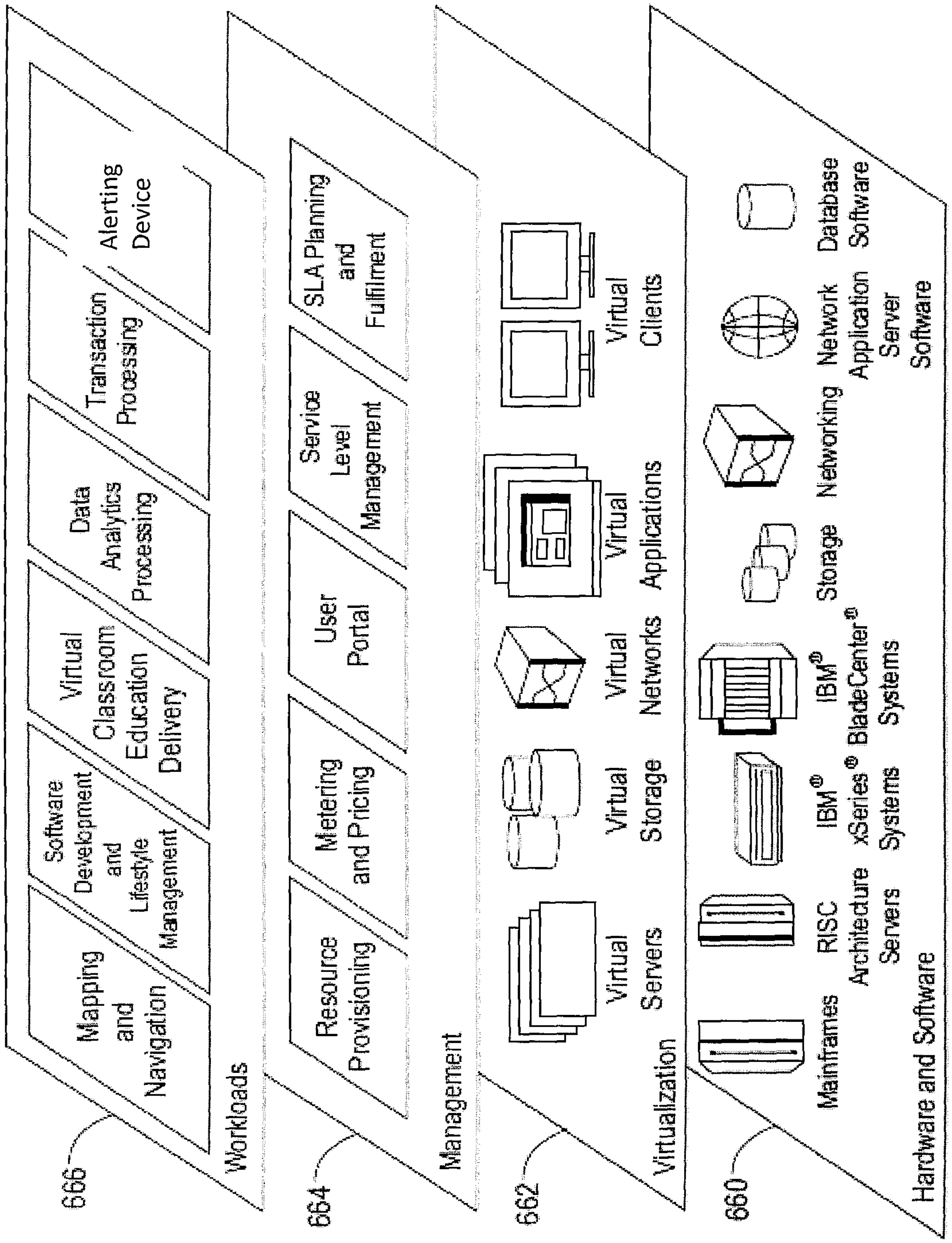
FIG. 7 depicts abstraction model layers according to a further embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided: Hardware and software layer 660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 662 provides an abstraction layer from which the following examples of virtual entities can be provided: virtual servers; virtual storage; virtual networks, including virtual private networks; virtual applications and operating systems; and virtual clients.

In one example, management layer 664 can provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 666 provides examples of functionality for which the cloud computing environment can be utilized. Examples of workloads and functions which can be provided from this layer include: mapping and navigation; software development and lifecycle management; virtual classroom education delivery; data analytics processing; transaction processing; and Context-Sensitive Negotiation Module (described in detail above).

What is claimed is:

1. An alerting device for sending an alert message, the alerting device configured to perform a method comprising:

determining at least one cognitive need of one or more message recipients in an area;

selecting an alert message that meets the at least one cognitive need of one or more message recipients in the area;

sending the alert message to one or more message recipients in the area; and monitoring the responsiveness of one or more message recipients in the area to the alerting message; wherein:

the alert message is not caused by the one or more message recipients in the area;

determining at least one cognitive need of the one or more of message recipients is based on a cognitive assessment of the one or more message recipients;

wherein conducting a cognitive assessment of the one or more message recipients includes at least one of: video analysis, sound monitoring, and/or motion detection; and wherein conducting a cognitive assessment further comprises:

learning a message recipient's typical bed times, typical sleep cycles, language preferences, and medications;

determining a message recipients potential distractions, using headphones, watching TV, and being engaged in a phone conversation.

2. The method of claim 1 wherein based on the responsiveness of the message recipients in the area selecting a different alert message is sent to the one or more message recipients in the area.

3. The method of claim 1, wherein the alerting device determines at least one cognitive need of the one or more message recipients in the area periodically.

4. The method of claim 1, wherein a remote device is connected to the alerting device, wherein the remote device communicates the cognitive needs of the one or more message recipients to the alerting device.

5. The method of claim 1, wherein selecting an alert message that meets at least one cognitive need of one or more message recipients comprises selecting from at least one of: choice of words, prosody of an alert message, voice of a specific person speaking an alert message, volume of an alert message, speed of an alert message, gender of a spoken voice, and/or accent of a spoken voice.

6. A system for executing sending an alert message, the system comprising:

a memory;

a processor coupled to the memory; and a control program communicatively coupled to the memory and the processor device, the control program comprising the steps of a method comprising:

determining at least one cognitive need of one or more message recipients in an area;

selecting an alert message that meets the at least one cognitive need of the one or more message recipients in the area;

sending the alert message to one or more message recipients in the area; and tracking the responsiveness of one or more message recipients in the area; wherein the alert message is not caused by the one or more message recipients in the area;

determining at least one cognitive need of the one or more of message recipients is based on a cognitive assessment of the one or more message recipients; and wherein conducting a cognitive assessment of the one or more message recipients includes at least one of: video analysis, sound monitoring, and/or motion detection; and wherein conducting a cognitive assessment further comprises:

learning a message recipient's typical bed times, typical sleep cycles, language preferences, and medications;

determining a message recipients potential distractions, using headphones, watching TV, and being engaged in a phone conversation.

7. The system of claim 6, wherein based on the responsiveness of the message recipients in the area selecting a different alert message to be sent to the one or more message recipients in the area.

8. The system of claim 6, wherein determining at least one cognitive needs of the one or more of message recipients is based on a cognitive assessment of the one or more message recipients.

9. The method of claim 6, wherein the alerting device determines at least one cognitive need of the one or more message recipients in the area periodically.

10. The method of claim 6, wherein a remote device is connected to the alerting device, wherein the remote device communicates the cognitive needs of the one or more message recipients to the alerting device.

11. The system of claim 6, wherein the responsiveness of the one or more message recipients is communicated to an emergency agency.

12. The system of claim 6, wherein the cognitive needs of the one or more message recipients is determined by information received from a device worn by the one or more message recipients.

13. The system of claim 6, wherein the alerting device is a cognitive smoke detector.

14. The system of claim 6, wherein the memory includes multiple alert messages that are classified according to the one or message recipients' cognitive needs.

15. A computer program product for sending an alert message, the computer program product comprising a computer readable storage medium having program instructions embodied therewith, wherein the computer readable storage medium is not a transitory signal per se, the program instructions executable by a computer to cause the computer to perform a method comprising:

determining at least one cognitive need of one or more message recipients in an area;

selecting an alert message that meets at least one cognitive need of the one or more message recipients in the area;

sending the alert message to one or more message recipients in the area; and tracking the responsiveness of one or more message recipients in the area; wherein the alert message is not caused by the one or more message recipients in the area;

determining at least one cognitive need of the one or more of message recipients is based on a cognitive assessment of the one or more message recipients; and wherein conducting a cognitive assessment of the one or more message recipients includes at least one of: video analysis, sound monitoring, and/or motion detection; and wherein conducting a cognitive assessment further comprises:

learning a message recipient's typical bed times, typical sleep cycles, language preferences, and medications;

determining a message recipients potential distractions, using headphones, watching TV, and being engaged in a phone conversation.

16. The alerting device of claim 1 wherein:

the alerting device is configured to send the alert message upon the detection of an alarm condition.

17. The alerting device of claim 16 wherein:

the alarm condition comprises the detection of smoke.

* * * * *